United States Patent [19]

Miyagi

[11] Patent Number: 4,605,884
[45] Date of Patent: Aug. 12, 1986

[54] CONTROL UNIT
[75] Inventor: Ken Miyagi, Yokohama, Japan
[73] Assignee: Canon Kabushiki Kaisha, Tokyo, Japan
[21] Appl. No.: 697,421
[22] Filed: Feb. 1, 1985

Related U.S. Application Data

[63] Continuation of Ser. No. 488,176, Apr. 25, 1983, abandoned.

[30] Foreign Application Priority Data

Apr. 30, 1982 [JP] Japan .................................. 57-71383

[51] Int. Cl.$^4$ .............................................. H02P 5/00
[52] U.S. Cl. .................................... 318/314; 318/312; 318/317; 318/636; 318/461
[58] Field of Search ............... 318/384, 385, 392, 393, 318/404, 396, 397, 398, 314, 271, 276, 277, 267, 279, 306, 309, 310, 430, 431, 626, 461

[56] References Cited

U.S. PATENT DOCUMENTS

| | | | |
|---|---|---|---|
| 3,176,208 | 3/1965 | Gifft | 318/314 |
| 3,309,597 | 3/1967 | Gabor et al. | 318/461 X |
| 3,706,923 | 12/1972 | Dunfield | 318/599 X |
| 3,708,737 | 1/1973 | Johnson | 318/616 X |
| 3,911,343 | 10/1975 | Oster | 318/392 |
| 4,238,716 | 12/1980 | Redmond | 318/314 |
| 4,284,940 | 8/1981 | Welburn | 318/341 X |
| 4,338,555 | 7/1982 | Rhodes | 318/616 X |
| 4,366,422 | 12/1982 | Rhodes | 318/616 X |
| 4,374,350 | 2/1983 | Kohzai et al. | 318/616 X |
| 4,375,609 | 3/1983 | Wolf | 318/312 |
| 4,453,118 | 6/1984 | Philips et al. | 318/396 X |

FOREIGN PATENT DOCUMENTS 1386961  3/1975  United Kingdom ............... 318/309

Primary Examiner—Bernard Roskoski
Assistant Examiner—Shik Luen Paul Ip
Attorney, Agent, or Firm—Fitzpatrick, Cella, Harper & Scinto

[57] ABSTRACT

A control unit for a movable member comprises a motor for driving the movable member, a speed detector for detecting a rotating speed of the motor, a reference signal generator, amplifiers of different gains for amplifying a signal representing a phase difference between a speed signal from the speed detector and a reference signal from the reference signal generator, a selector for selecting one of the outputs of the amplifiers in accordance with the velocity signal and the reference signal, and a driver for driving the motor by the selected amplifier output.

18 Claims, 7 Drawing Figures

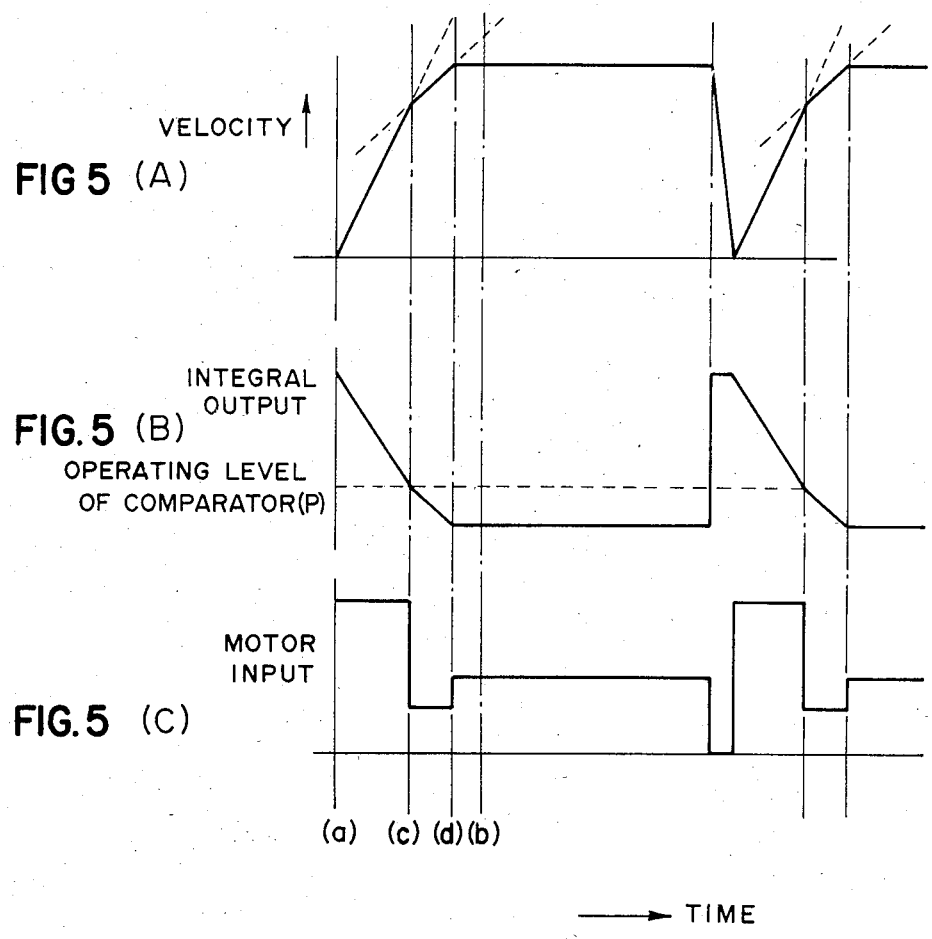

CONTROL UNIT

This application is a continuation of application Ser. No. 488,176 filed Apr. 25, 1983 now abandoned.

BACKGROUND OF THE INVENTION

1. Field of the Invention

The present invention relates to a control unit for controlling a speed of an original reading optical scanner of a copying machine or the like.

2. Description of the Prior Art

An equipment having a control unit of this type such as an original reader 10 of a copying machine is generally constructed as shown in FIG. 1, in which an original 4 is mounted on an original mounting glass plate 3 and the original 4 is illuminated by a scanning unit 7 including a bar lamp or a fluorescent lamp 7a and a reflecting mirror 7b disposed at an angle of 45 degrees to the glass plate 3 and a reflected light from the original is directed in a direction of transfer F so that an entire area of the glass plate 3 is scanned. The light reflected in the direction of transfer of the scanning unit 7 is directed to a photo-electric conversion element array 5 through a lens 8 by a deflection mirror unit 6. The photo-electric conversion element array 5 may be a line of charge coupled devices (CCD's) which is a line sensor that scans the original 4 transversely to the direction of transfer F to convert a reflected light image of the original 4 to an electrical signal and sub-scans the original 4 by the transfer of the scanning unit 7. The scanning unit 7 is driven by a motor 1 through a tension wire 2 spanned across pulleys 9 located at corners of a rectangular loop. It starts to move from a home position (a) which is slightly displaced from an image edge position (b) of the original mounting glass plate 3 and driven such that it reaches a reference transfer speed before it is brought to the image edge position (b). If the transfer speed of the scanning unit 7 does not reach the reference speed, the sub-scan of the original 4 would be ununiform and a reproduced image would be destored. Accordingly, it is essential that the scanning unit 7 is driven at the reference speed after it has reached the image edge position (b). After the entire area of the original mounting glass plate 3 has been scanned, the scanning unit 7 is returned to the home position (a). This reverse transfer is done by reversing the direction of rotation of a shaft of the motor 1 by a clutch or reversely rotating the motor 1.

In such an original reading optical scanner, a D.C. motor has been used in view of compactness, high speed of scan, high precision and high geometry to output torque ratio. The D.C. motor is particularly advantageous because it has a high start torque, can reach a high speed very rapidly and can control a speed over a wide range and control the direction of rotation forwardly or backwardly by controlling a field current or a field voltage.

FIG. 2 shows a circuit configuration of a prior art control unit which utilizes such a D.C. motor. Numeral 21 denotes a D.C. motor which is a drive source of an original reading optical scanner. A magnetic or optical encoder 22 is attached to a rotating shaft of the D.C. motor 21 and it generates a train of pulses of a frequency proportional to a rotating speed of the motor shaft. Numeral 23 denotes a reference oscillator which oscillates at a frequency $f_r$ which is a reference to the rotating speed. Numeral 25 denotes a phase comparator which compares a phase of the reference oscillation output signal at the frequency $f_r$ from the reference oscillator 23 with a phase of the pulse train at a frequency $f_f$ from the encoder 22 and produces a high logical level output signal "H" when $f_r > f_f$, a low logical level output signal "L" when $f_r < f_f$ and a reference level output signal "½ Vcc" when $f_r = f_f$. Numeral 26 denotes a low-pass filter which passes only the phase compare output signal and converts it to a D.C. signal. Numeral 27 denotes a phase compensator which phase-compensate a motor control system. Numeral 28 denotes an amplifier and numeral 29 denotes a power transistor which controls the rotating speed of the motor 21. In such a scan control unit, when the oscillation output signal of the reference frequency $f_r$ is applied to the phase comparator 25, the frequency $f_f$ of the other input signal (the output from the encoder 22) is lower than $f_r$ until the rotating speed of the motor 21 reaches the reference, and the compare output signal remains at the high level "H". As the rotating speed of the motor 21 increases, the frequency $f_f$ becomes higher than the frequency $f_r$ and the compare output signal assumes the low level "L". As a result, the rotating speed of the motor 21 is reduced and the frequency $f_f$ again becomes lower than the frequency $f_r$. By repeating the reversal of the phase comparison output, the rotating speed of the motor 21 gradually approaches to the reference and settled to a condition of $f_r = f_f$. Thereafter, the coincidence of the reference frequency $f_r$ and the rotating frequency $f_f$ is maintained.

However, the prior art control unit has the following disadvantage in enhancing the compactness and high speed of the optical scan drive mechanism. In order to attain the coincidence of the reference frequency $f_r$ and the rotating frequency $f_f$, the rotating speed of the motor 21 traces a path as shown in FIG. 3. If the distance between the home position (a) and the image edge position (b) shown in FIG. 1 is reduced in order to reduce the size of the optical scan drive mechanism, an acceleration distance for the rotating speed of the motor 21 to reach the reference speed is so short that the rotating speed reaches the reference speed after the image edge position (b) as shown by a curve (B) in FIG. 3 and a distortion occurs at the edge of the reproduced image. If a gain of the amplifier 28 of the motor control unit of FIG. 2 is increased to drive the motor 21 at a higher speed in order to avoid the occurrence of the distortion, the rotating speed oscillates (hunting) until the rotating speed settles at the reference speed and another distortion occurs in the reproduced image. As a result, it is necessary to adjust the characteristic of the low-pass filter 25 and the characteristic of the phase comparator 27 to attain a proper rotating speed change. However, because of a limitation on the range of adjustment of the characteristics, it is not possible to realize the desired proper rotating speed change. The problem of adjustment of the characteristics is also encountered when the original scan speed is to be increased. That is, when a time to reach the reference scan speed is to be reduced for a given acceleration distance of the scan unit, the same problem of adjustment of the characteristics is encountered.

SUMMARY OF THE INVENTION

It is an object of the present invention to provide a control unit which enables a movable body driven by a motor to reach a predetermined speed in a desired time or at a desired position.

It is another object of the present invention to provide a control unit which enables a driven equipment to be driven at an optimum condition so that a scan unit of a compact and high speed original reading optical scanner can smoothly reach a reference scan speed without causing distortion in a reproduced image and life of a lamp or a fluorescent lamp of the scan unit is extended.

It is yet another object of the present invention to provide a control unit which enables a movable body to scan stably.

BRIEF DESCRIPTION OF THE DRAWINGS

FIGS. 5(A), 5(B) and 5(C) show waveforms of the control unit of FIG. 4.

DETAILED DESCRIPTION OF THE PREFERRED EMBODIMENT

Figure 1:
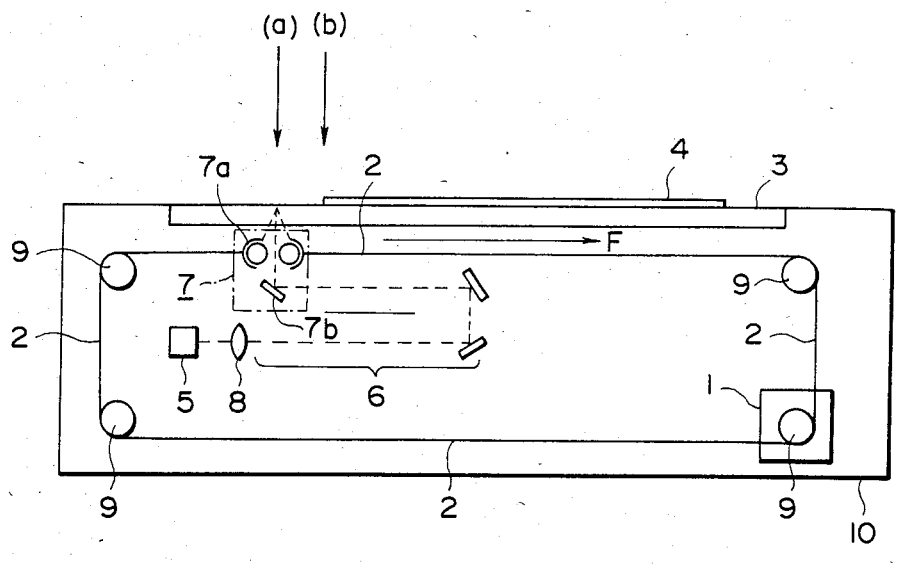
FIG. 1 shows a schematic configuration of a scanner of a copying machine.
Figure 3:
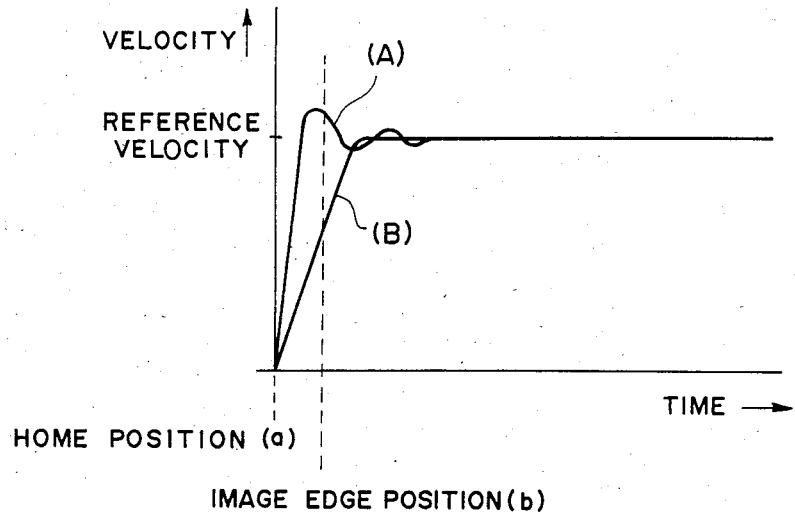
FIG. 3 shows characteristic curves of the control unit of FIG. 2.
Figure 2:
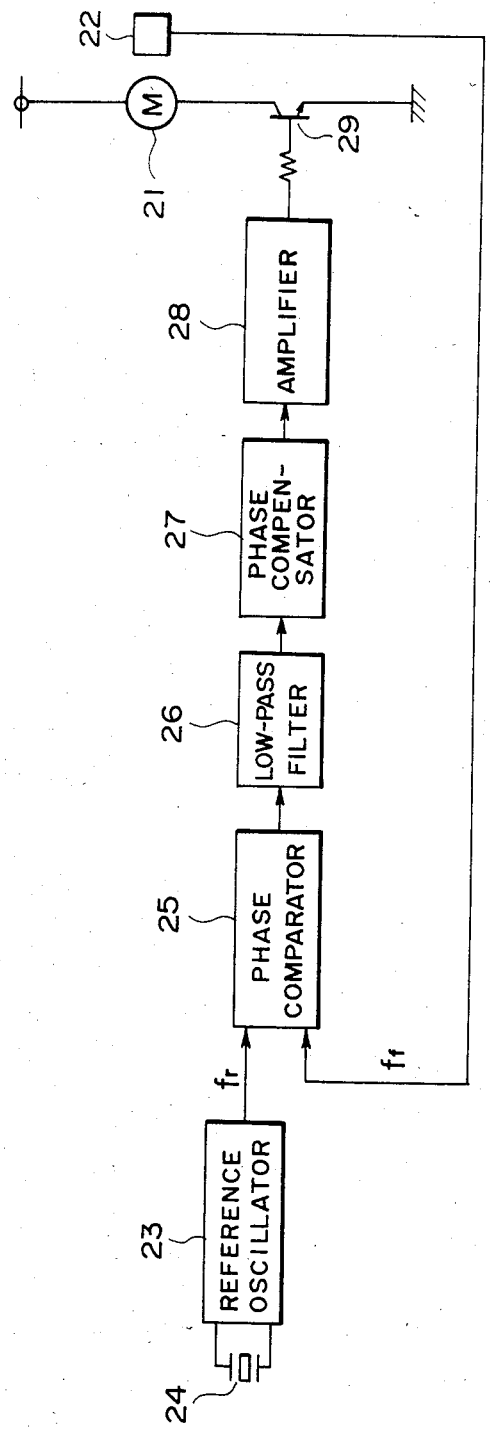
FIG. 2 shows a block diagram of a prior art control unit.
Figure 4:
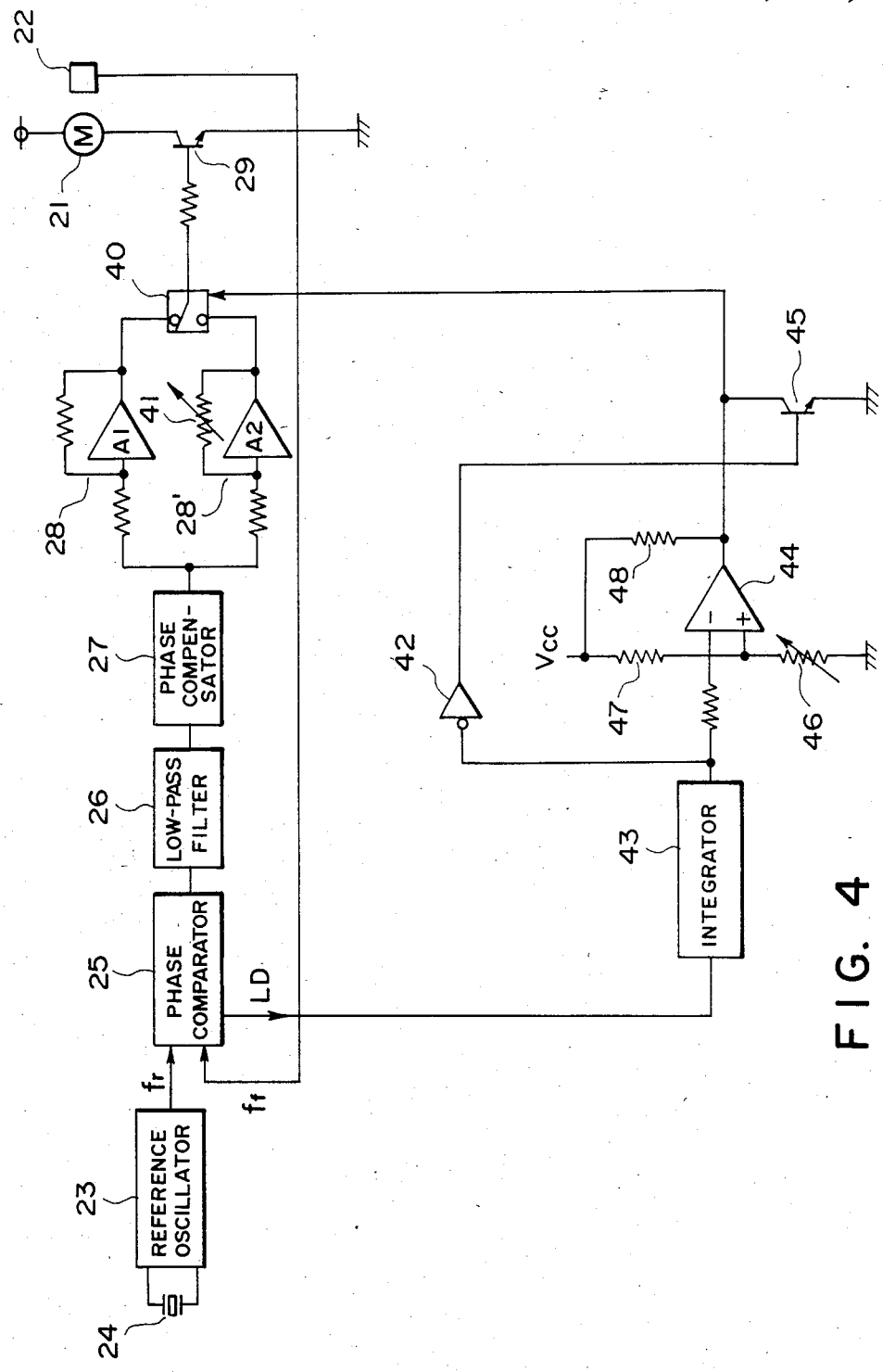
FIG. 4 shows a block diagram of a control unit of the present invention.

FIG. 4 shows a configuration of a control unit of the present invention, in which the like elements to those shown in FIG. 2 are designated by the like numerals and they are not explained here but only new elements are explained. Numeral 28' denotes an amplifier which is similar to the amplifier 28 but has a variable gain. A feedback loop is formed in an operational amplifier A2 and a potentiometer 41 is arranged in the feedback loop to vary the gain. The gain is set to be lower than a gain of the amplifier 28. A switch 40 selects outputs of the amplifiers 28 and 28' and supplies the selected one of the outputs to the power transistor 29. It may be a semiconductor analog switch or a relay.

The output LD of the phase comparator 25 assumes the low logical level "L" when the reference frequency $f_r$ and the rotating frequency $f_f$ of the motor 21 are equal, that is, they are in phase-synchronism, and produces a differential phase comparison output in other state. The phase comparator for producing the output LD may be a commercially available TC 5081P.

Numeral 42 denotes an inverter for inverting a phase and numeral 43 denotes an integrator which converts a pulse waveform proportional to the phase difference in the output LD to a D.C. signal. The integrated output of the integrator 43 assumes the low logical level L when the frequency $f_r$ is equal to the frequency $f_f$. Numeral 44 denotes an open-connected inverting comparator. A reference voltage is set by voltage dividing resistors 46 and 47. It is variable by the potentiometer 46. When a voltage at an inverting (−) input terminal of the inverting comparator 44 is lower than the reference voltage, a compare output is rendered to the high logical level "H" by a pull-up resistor 48. Numeral 45 denotes a switching transistor which gates the high logical level compare output to control the switching of the switch 40.

The operational waveforms of the control unit described above are shown in FIGS. 5(A)–5(C). FIG. 5(A) shows a variation of the original scan speed. The scan speed rises from the home position (a) and reaches the reference speed at a point (d) slightly before the image edge position (b). The scan unit 7 is stopped after it has scanned the entire area of the glass plate 3 and then returned to the home position (a). FIG. 5(B) shows variation of the output voltage of the integrator 43, and FIG. 5(C) shows variation of a drive power supplied to the motor 21. When the scan unit 7 is returned to the home position (a), the polarity of the input to the motor is reversed although it is shown in the same polarity in FIG. 5(C).

When the scan unit 7 is started from the home position (a), the speed gradually increases from zero. Since the rotating frequency $f_f$ of the motor is lower than the reference frequency $f_r$, the output of the phase comparator 25 represents the phase difference and the output signal of the phase comparator 25 assumes the high level H. The output LD of the phase comparator 25 is converted to the D.C. signal by the integrator 43. It is at the high level H at the start of scan and assumes the low level when the reference speed is reached. By setting the reference voltage of the comparator 44 to a level (p) shown in FIG. 5(B), the comparator 44 does not compare until the point (c) in FIG. 5(C) is reached. Therefore, the compare output remains at the low level L. When the control input to the switch 40 is at the low level L, the switch 40 is connected to the amplifier A1 of the amplifier 28 so that the high level output of the phase comparator 25 is amplified to a maximum extent and the amplified output is supplied to the power transistor 29. Accordingly, as shown in FIG. 5(C), the maximum power is supplied to the motor 21 during a period from the home position (a) to the point (c). Then, as the rotating speed of the motor 21 gradually increases and the point (c) is reached, the integrated output gradually decreases and falls below the reference level (p) of the comparator 44. However, when the point (c) is reached, the polarity of the compare output of the comparator 44 is reversed and the high level output H is produced. Therefore, the switch 40 is switched to the amplifier A2 of the amplifier 28'. However, since the gain of the amplifier 28' is lower than that of the amplifier 28, the motor input from the power transistor 29 is reduced as shown by the section (c)–(d) of FIG. 5(C) so that the acceleration of the rotating speed of the motor 21 is reduced. When the rotating speed of the motor 21 rises so that the rotating frequency $f_f$ coincides with the reference frequency $f_r$, the output LD of the phase comparator 25 assumes the low level L and the integrated output assumes the low level L. As a result, the output of the inverter 42 is reversed to the high level H to turn on the transistor 45. Thus, the output of the comparator 44 assumes the low level L in spite of the fact that it is conditioned to assume the high level H and the switch 40 is again switched to the amplifier 28. This switching point is shown by the point (d) in FIG. 5(C). After the rotating speed of the motor 21 has reached the reference speed, the phase comparator 25 detects a small error in the motor rotating frequency $f_f$ and a power corresponding to the error is amplified by the high gain amplifier 28, which in turn drives the motor 21 to recover the reference speed as rapidly as possible.

The control unit of the present invention is not only applicable to the original reading optical scanner described above to attain the effects and the advantages described above but also applicable to drive an apparatus which starts from a home position and must rapidly reach a predetermined speed within a period of movement of a short predetermined distance to attain the similar effects. It is also applicable to drive an apparatus which starts from a home position and must reach a predetermined speed within a predetermined time period.

In the present embodiment, the phase difference between the reference signal from the reference oscillator 23 and the output from the encoder is detected to control the speed of the scanning optical system. In an alternative embodiment, the speed control by the frequency detection is carried out until the encoder output reaches a predetermined frequency, and after the encoder output has reached the predetermined frequency, the speed control by the phase difference described above is carried out. In this case, even if the motor speed suddenly changes by an external force, the motor rotating speed can be instantly stabilized by the frequency control.

As described hereinabove, according to the present invention, the power to be supplied to the driving motor can be adjusted by appropriately setting the reference level of the comparator 44 within a short period from the start of the driven equipment such as the scan unit of the original reading optical scanner to the time point at which the reference scan speed is reached so that the reference scan speed is reached rapidly and smoothly, and once the reference scan speed has been reached, the speed error is compensated with the maximum gain. Accordingly, the hunting which would occur when the motor is driven by a constant power as is done in the prior art is avoided and the reference scan speed is attained rapidly and smoothly without delay. Thus, the original can be scanned at the reference speed smoothly and stably from the edge of the original mounting plate. Accordingly, a high quality of image is reproduced by the original reading optical scanner. Accordingly, the present invention can attain the size reduction and the high speed of the driven equipment such as the scanner of the copying machine and suppress the vibration of the driven equipment so that the life of the lamp or the fluorescent lamp of the driven equipment can be extended.

When the present invention is applied to a copying machine with a variable scale function, the speed control in accordance with the scan speed of the optical system is achieved by switching the reference level (reference voltage) of the comparator 44 in accordance with a scaling factor selected by a key. Alternatively, the gain of the operational amplifier A2 may be changed in accordance with the scaling factor.

Alternatively, a plurality of (for example, four) amplifiers may be arranged and combination thereof may be changed in accordance with the scaling factor.

A plurality of (for example, three) amplifiers may be provided for one scaling factor and they may be sequentially selected by a selector so that a finer speed control is attained. Thus, the movable body of the scanning optical system can smoothly reach the reference speed without hunting.

The present invention is not limited to the illustrated embodiments but various modifications can be made within the scope of the appended claims.

What is claimed is:
1. A control unit comprising:
a motor;
speed detection means for detecting a rotating speed of said motor and for producing a velocity signal;
reference signal generating means for generating a reference signal;
means for producing an output in response to the result from phase comparison of the velocity signal from said speed detection means and the reference signal to regulate the speed of said motor;
first amplified signal output means for amplifying a signal corresponding to the output from said producing means at a first gain to produce a first driving signal;
second amplified signal output means for amplifying a signal corresponding to the output from said producing means at a second gain different from the first gain to produce a second driving signal;
means for driving said motor in accordance with the first or second driving signal; and
changing means for applying only the first driving signal to said driving means during the start of said motor and changing from the first driving signal to the second driving signal when the rotating speed of said motor reaches a predetermined stage after the start of said motor.

2. A control unit according to claim 1 wherein said changing means changes from the first driving signal to the second driving signal in response to the result from phase comparison of the velocity signal and the reference signal.

3. A control unit according to claim 2 wherein said changing means includes an integrator for producing an integrated output in response to a phase difference between the velocity signal and the reference signal.

4. A control unit according to claim 1 wherein said changing means changes from the second driving signal to a third driving signal produced by said first amplified signal output means when said motor reaches a set speed in the start of said motor and said means for driving is arranged to drive said motor in accordance with the first, second or third driving signal.

5. A control unit for a movable member comprising:
a motor for driving said movable member;
detection means for detecting a rotating speed of said motor and for producing a detection output;
means for comparing the detection output with a reference signal to generate an error signal;
drive means for providing driving signals to said motor to regulate the speed of the motor in accordance with the error signal, said drive means including first and second drivers connectable to said motor for providing different level driving signals to drive said motor; and
changing means for connecting only said first driver to said motor during the start of said motor and changing from said first driver to said second driver when the rotating speed of said motor reaches a predetermined stage after the start of said motor.

6. A control unit for a movable member according to claim 5 further comprising reference signal generating means for generating the reference signal, wherein said drive means drives said motor in accordance with an output representing a phase difference between the reference signal and the detection output.

7. A control unit for a movable member according to claim 6 wherein each of said first and second drivers has an amplifier of different gain from each other, each amplifier amplifying a signal in accordance with the output representing the phase difference between the reference signal and the detection output.

8. A control unit for a movable member according to claim 6 or 7 wherein said changing means changes said drivers in accordance with the phase difference between the reference signal and the detection output.

9. A control unit for a movable member according to claim 5 wherein said movable member is a scanning member for scanning an original sheet.

10. A control unit for a movable member according to claim 5 wherein said changing means changes the second driver to the first driver when said motor reaches a set speed in the start of said motor.

11. A control unit for a movable member in accordance with claim 5, wherein the driving signals provided to said motor to regulate the speed thereof are in proportion to the error signal.

12. A control unit for a movable member comprising:
    detection means for detecting movement of said movable member and for producing a detection output;
    control means having first, second and third control modes for controlling said movable member in response to the detection output of said detection means to regulate an operation of the movable member; and
    changing means for providing only the first control mode during the start of said movable member, changing from the first control mode to the second control mode of said control means when the operation of said movable member reaches a first stage after the start of said movable member and changing from the second control mode to the third control mode when said movable member reaches a second stage after the start of said movable member.

13. A control unit for a movable member according to claim 12 wherein said control means includes first and second drivers for driving said movable member and said changing means changes said drivers in response to said detection output to change control modes of said control means.

14. A control unit for a movable member according to claim 13 further comprising reference signal generating means for generating a reference signal, wherein said control means controls said movable member in response to an output representing a phase difference between the reference signal and the detection output.

15. A control unit for a movable member according to claim 14 wherein said changing means changes said drivers in response to the phase difference between the reference signal and the detection output.

16. A control unit for a movable member according to claim 14 or 15 wherein said drivers each has an amplifier of different gain from each other for amplifying a signal in accordance with the output representing the phase difference between the reference signal and detection output.

17. A control unit for a movable member according to claim 12 wherein said movable member is a scanning member for scanning an original sheet.

18. A control unit for a movable member according to claim 12 wherein said third control mode is the same as said first control mode.

* * * * *